No. 726,198. PATENTED APR. 21, 1903.
E. SMITH.
MEASURING DEVICE.
APPLICATION FILED AUG. 6, 1902.
NO MODEL.
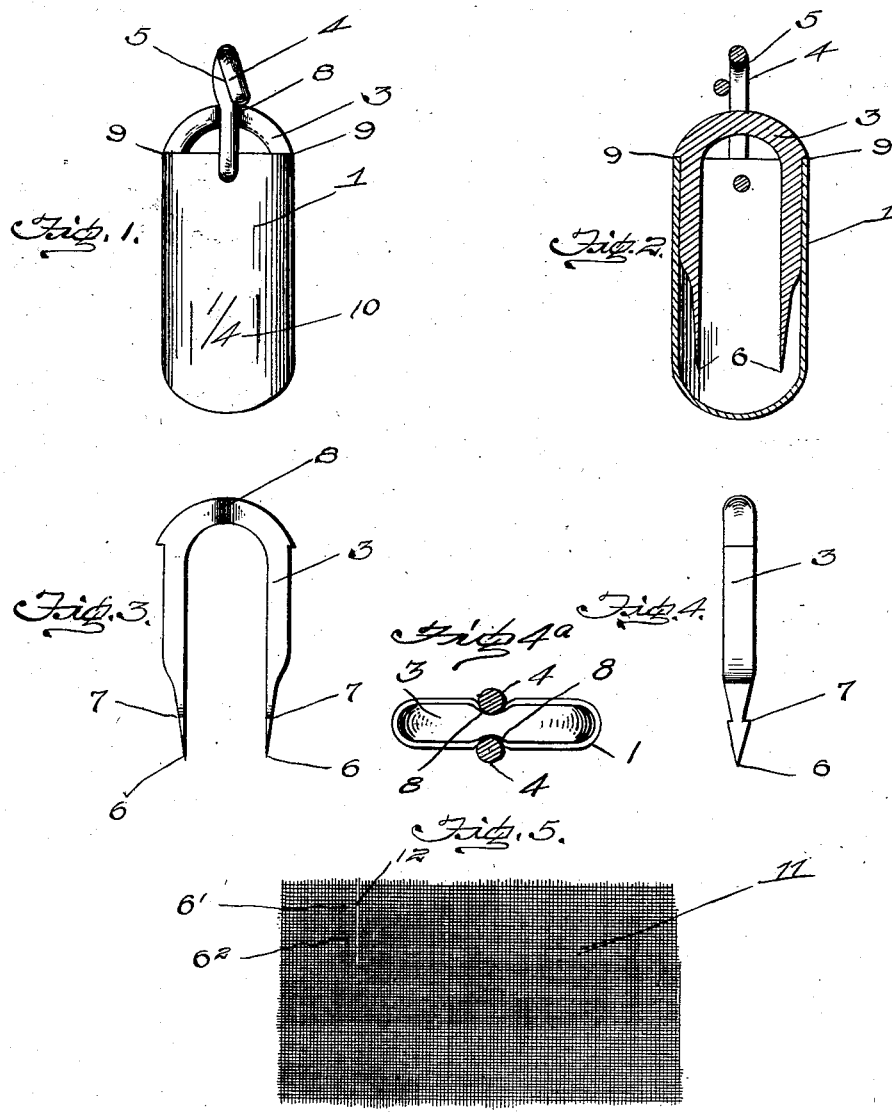
Inventor
Edward Smith
Witnesses
Jas. A. S. Koehl.
Wilbur S. Hauer
By H. B. Willson & Co.
Attorneys

UNITED STATES PATENT OFFICE.

EDWARD SMITH, OF BRADFORD, ENGLAND.

MEASURING DEVICE.

SPECIFICATION forming part of Letters Patent No. 726,198, dated April 21, 1903.

Application filed August 6, 1902. Serial No. 118,681. (No model.)

*To all whom it may concern:*

Be it known that I, EDWARD SMITH, a subject of the King of Great Britain, residing at Bradford, in the county of York, England, have invented certain new and useful Improvements in Measuring Devices; and I do declare the following to be a full, clear, and exact description of the invention, such as will enable others skilled in the art to which it appertains to make and use the same.

This invention relates to a novel and useful device for measuring off a certain space in a piece of fabric to enable the number of threads (either warp or weft) interwoven into the fabric to be determined with perfect accuracy.

The object of the invention is to provide a simple and inexpensive device of this character by means of which the number of threads in a piece of fabric of any given size may be easily and quickly determined; and a further object is to provide a casing for such device whereby the same may be protected from injury and carried in the pocket or suspended from a watch-chain, so as to be conveniently reached for use.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a front elevation showing the measuring device fitted in its casing. Fig. 2 is a central vertical section through the casing and measuring device. Figs. 3 and 4 are a side and an end view of the measuring device. Fig. 4ᵃ is a top plan view of the measuring device and casing. Fig. 5 is a diagram showing the manner in which the device is used for measuring off a certain space in a piece of fabric.

Referring now more particularly to the drawings, 1 represents a casing, preferably flat and open at one end and closed at the opposite end. This casing is adapted to receive the measuring device 3 and is provided at its open end with a pivoted bail 4, formed with a loop or eye 5. The casing, with the contained measuring device, is small enough to be carried in a vest or change pocket, and the loop or eye 5 enables said casing to be, if desired, attached to a watch or key chain, so that the device may be conveniently carried on the person and readily reached for use.

The measuring device comprises a U-shaped body reduced at its ends to form penetrating teeth or points 6 and notched adjacent thereto to provide shoulders 7. The points 6 are spaced a determined distance apart—say a quarter of an inch—so as to measure off a corresponding space in the fabric to be tested. The distance between the edges of the body—*i. e.*, between the outer faces of the arms of the body—may conform approximately to the internal width of the casing, so that the device when fitted in the casing will slightly bind and be thereby prevented from falling out or becoming dislodged by shocks or jars. As a further precaution against loss I may provide the bend of the device on opposite sides with recesses or indentations 8 to receive the arms of the bail, which may be made to snap therein, so that the bail will be in the center line of the casing and act as a stop to prevent the measuring device from having outward movement. To withdraw the measuring device, however, it is simply necessary to swing the bail to one side and then while holding the casing in one hand to grip the device with the thumb and forefinger of the other hand and exert a pull thereon. Stop-shoulders 9, formed on the measuring device adjacent to the bend thereof, are provided to contact with the wall of the open end of the casing to prevent the device from being forced too far into the casing and to hold the points out of contact with the casing, thus preventing wear thereon.

If desired, the front of the casing may be provided with a gage 10 by which the accuracy of the measuring device may be tested, so that it may be readily determined when the points require resetting.

Fig. 5 shows the method of using the device. The piece of cloth 11 to be tested is cut across the threads, as shown at 12, and backed up by a piece of blotting-paper. Then the points 6 of the counter are inserted near the edge of the cloth and the latter drawn upward over the shoulders 7. The threads between the edge of the cloth and outer perforation 6', formed by one of the points, are then taken out and discarded, and the point forming said perforation 6' withdrawn and turned away from said perforation. The threads between the outer thread and other perforation 6² are then drawn out and counted, thus indicating the number of threads to each quarter-inch. By thus using the device to determine the number of warp and weft threads within a certain space or portion of the fabric the total number of threads to the inch or interwoven into a piece of fabric of a given size may be readily ascertained.

From the foregoing description, taken in connection with the accompanying drawings, the construction and mode of use of the invention will be readily understood, and it will be seen that a simple, effective, and inexpensive device for the stated purpose is provided.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination of a casing, a measuring device adapted to fit therein and provided with recesses, and a bail pivoted to the casing and adapted to engage said recesses, substantially as set forth.

2. The combination of a casing, a measuring device adapted to fit therein and having shoulders to limit its inward movement, and a bail pivoted to the casing and adapted to interlock with said measuring device when swung into line therewith, whereby the measuring device is held from outward movement, substantially as and for the purpose specified.

In testimony whereof I have hereunto set my hand in presence of two subscribing witnesses.

EDWARD SMITH.

Witnesses:
 FRANCIS WHITTLES,
 SAM WHITTLES.